(12) United States Patent
Poole et al.

(10) Patent No.: US 8,190,561 B1
(45) Date of Patent: May 29, 2012

(54) LDAP REPLICATION PRIORITY QUEUING MECHANISM

(75) Inventors: Jack Poole, Alpharetta, GA (US); Timothy Culver, Mesquite, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 309 days.

(21) Appl. No.: 11/567,234

(22) Filed: Dec. 6, 2006

(51) Int. Cl.
*G06F 7/00* (2006.01)
*G06F 17/00* (2006.01)

(52) U.S. Cl. ........................................ 707/610; 709/207
(58) Field of Classification Search .................. 707/624, 707/610
See application file for complete search history.

(56) References Cited

U.S. PATENT DOCUMENTS

| | | | |
|---|---|---|---|
| 5,956,714 A * | 9/1999 | Condon ............................. | 707/8 |
| 6,073,199 A * | 6/2000 | Cohen et al. .................... | 710/113 |
| 6,275,858 B1 * | 8/2001 | Bates et al. ..................... | 709/228 |
| 6,338,092 B1 * | 1/2002 | Chao et al. ..................... | 709/236 |
| 6,502,132 B1 * | 12/2002 | Kumano et al. ............... | 709/224 |
| 6,578,064 B1 * | 6/2003 | Saito et al. .................... | 718/103 |
| 6,658,485 B1 * | 12/2003 | Baber et al. ................... | 719/314 |
| 6,708,187 B1 * | 3/2004 | Shanumgam et al. ............... | 1/1 |
| 2002/0091815 A1 * | 7/2002 | Anderson et al. ............. | 709/223 |
| 2002/0107743 A1 * | 8/2002 | Sagawa ........................... | 705/17 |
| 2003/0020671 A1 * | 1/2003 | Santoro et al. ................ | 345/1.3 |
| 2003/0074360 A1 * | 4/2003 | Chen et al. .................... | 707/100 |
| 2003/0177296 A1 * | 9/2003 | Kurth ............................. | 710/244 |
| 2004/0093555 A1 * | 5/2004 | Therrien et al. .............. | 714/805 |
| 2004/0160971 A1 * | 8/2004 | Krause et al. ................. | 370/412 |
| 2004/0249870 A1 * | 12/2004 | Jeevanjee et al. ............. | 707/204 |
| 2005/0144189 A1 * | 6/2005 | Edwards et al. .............. | 707/102 |
| 2006/0171523 A1 * | 8/2006 | Greenwell ..................... | 379/242 |
| 2006/0277223 A1 * | 12/2006 | Gupta et al. ................... | 707/201 |
| 2007/0219816 A1 * | 9/2007 | Van Luchene et al. .......... | 705/1 |
| 2008/0134211 A1 * | 6/2008 | Cui .............................. | 719/318 |
| 2008/0208651 A1 * | 8/2008 | Johnston et al. ................. | 705/7 |

* cited by examiner

*Primary Examiner* — Pierre Vital
*Assistant Examiner* — Augustine Obisesan
(74) *Attorney, Agent, or Firm* — Parks IP Law LLC; Jennifer P. Medlin, Esq.

(57) ABSTRACT

A replication priority queuing system prioritizes replication requests in accordance with a predetermined scheme. An exemplary system includes a Replication Priority Queue Manager that receives update requests and assigns a priority based upon business rules and stores the requests in associated storage means. A Replication Decision Engine retrieves the requests from storage and determines a destination for the update based upon predetermined replication rules, and sends the update to the destination.

18 Claims, 6 Drawing Sheets

LDAP REPLICATION PRIORITY QUEUING MECHANISM

BACKGROUND

Telecommunications network providers must manage large volumes of data. For example, a telecommunications network provider may store millions of records of customer data on database server networks that are heavily accessed and frequently updated. This customer data can include customer identifications, passwords, addresses, preferences, etc. which must be accessible by a variety of different users. A common method for managing such data includes creating directory listings using the Lightweight Directory Access Protocol (LDAP). LDAP is a TCP/IP compliant protocol that provides for the quick access and update of directory listings. LDAP-supported systems have been implemented in a variety of contexts such as web browsers and email programs.

These LDAP directory listings are stored on database server networks that typically include multiple server tiers, each tier having one or more servers. For example, a server network can include a master server tier, a HUB server tier, and a proxy server tier, among other tiers. Each server tier is located at different proximities from a user. For example, a proxy server may be located in close proximity to a user whereas a higher level master server may be located further from the user. Generally, the closer the data is stored to a user, the quicker the response to a user query. Thus, in an effort to avoid delays, data that is frequently accessed by a user is typically stored on a server in close proximity to the user. For example, data associated with common user queries can be stored on a proxy server near the user.

When a modification to the data is made by a client application, the data is typically updated throughout the server network depending upon the particular characteristics of the update. A typical update involves providing the modification to a master server and then propagating the modification throughout the server network. The master server serves as a gatekeeper for data updates ensuring data integrity. The modification also referred to herein as an update can then be sent to other servers as required. For example, when a user creates a new password for use on the communications network then this change is updated on the server network. If the user has multiple access points to the network the new password must be made available to servers serving those access points so that the user can login from all the access points. For example, the new password can be sent to a master server associated with the user along with an update request requesting that the server network be updated with the new password. The master server receives the user's new password and update request and updates the network by propagating the new password throughout the server network as required. This propagation of this modification or data update to other servers is often referred to as "replication." By replicating data from the master server to other servers, the modification is "pushed" to server tiers closer to the user, thereby enabling the network to provide the user with a quick and accurate response from multiple server locations. Thus, a modification of the network triggers an update request requesting that the server network be updated to reflect the modification. This update request may be referred to as a replication request herein.

This update or replication process allows other servers in addition to a master server to respond to user requests. To maintain control over the replication process and ensure data integrity, LDAP servers are typically arranged in a master-slave arrangement. Replication requests are thus first sent to the master server and then updates sent to server destinations or "replicated" as required.

As discussed above, in order to update data throughout the server network, data is replicated across various server tiers so that multiple servers can provide up-to-date data. Problems can arise however when data is not efficiently updated at the master server or efficiently replicated to other servers. Under prior art LDAP schemes updates are processed on a first-in-first-out basis without regard to business decisions or priorities. But many of these updates do not require immediate replication throughout the server network. For example, a modification changing a user's mailing address will not immediately affect a user's use of the telecommunications system. However, the change of a password can significantly affect a user's ability to access the network if it is not immediately replicated. In addition, large numbers of replication requests are frequently stored as batch update requests. These batch requests can require a large amount of resources to process. Under the present first-in-first-out approach if a large batch file is received at an LDAP server prior to the aforementioned password update request, the batch request would be processed first, thereby resulting in the delay of the replication of the password request. This delay is undesirable as it can affect the user's ability to access the network. Thus, there are a variety of update requests which can be received by the master for which immediate replication throughout the server network is desirable. Thus, problems can arise with the prior art first-in-first-out replication method. For example, large batch files of low priority may be received prior to more important requests which will be delayed as the system processes or replicates the earlier batch files.

Thus, it is desirable to have an improved method of updating server networks and more particularly processing update or replication requests and replicating data on a server network that overcomes these difficulties and allows high priority requests to be processed in a more timely manner.

SUMMARY OF THE INVENTION

As required, exemplary embodiments of the present invention are disclosed herein. These embodiments should be viewed with the knowledge that they are only examples of the invention and that the invention may be embodied in many various and alternative forms. The figures are not to scale and some features may be exaggerated or minimized to show details of particular elements, while related elements may have been eliminated to prevent obscuring novel aspects. Well known structures and functions have not been shown or described in detail to avoid unnecessarily obscuring the description of the embodiments of the invention. Therefore, specific structural and functional details disclosed herein are not to be interpreted as limiting, but merely as a basis for the claims and as a representative basis for teaching one skilled in the art to variously employ the present invention.

The present invention provides systems and methods for processing database requests in accordance with predetermined schemes thereby allowing more important or time critical updates to be processed prior to less important updates. By requests it is meant update requests received by a master server that require the replication of data across a network. The requests can include modifications, updates, or other operations but will be referred to generically herein as a request, an update request, or a replication request. In an exemplary embodiment of a system of the invention, a Replication Management System (RMS) is provided which is adapted to prioritize requests based upon a predetermined scheme. An update request can be received by the RMS, assigned a particular priority level, and stored in a designated priority queue. The update request can then be executed in accordance to the priority queue to which it is assigned. For example, an update request can be assigned to one of 5 priority queues and processed according to priority. In one exemplary embodiment of the invention the RMS can comprise a Replication Priority Queue Manager (RPQM) which receives update requests from a server network. The RMS can further comprise storage means for storing update requests and a Replication Decision Engine (RDE) for executing update requests in accordance with the predetermined rules and a request's particular assigned priority level. For example, all requests having highest priority, designated as priority 1, can be stored in a first queue at a first storage means, requests having the next highest priority, designated as priority 2, can be stored in a second queue at a second storage means, and so on. In the exemplary embodiment discussed herein, five priority levels and five associated queues are employed but it is contemplated that any number of priority levels or queues can be used.

While in the exemplary embodiments the update requests are shown as being stored in different physical storage means such as different databases, updates requests could be stored in a single physical structure but flagged as a particular priority in some way. The Replication Decision Engine processes the update requests in accordance with these priority levels. In one exemplary embodiment the RDE simply processes the updates for each storage means sequentially by priority level. For example, the RDE processes all of the priority 1 level requests stored in a first storage means queue and if all the priority one requests have been satisfied (i.e., when the first storage means is empty) then the RDE processes the priority 2 level requests until either another priority one request is received or until all priority 2 level requests are executed. This process can continue through the various priority levels. For example, once all priority 2 and priority 1 level requests are completed the RDE can begin processing the next highest priority level, level 3. Thus, updates in the highest priority queue are processed first and then the updates the other queues are processed in order of decreasing priority. The RDE system can continuously monitor the receipt of new requests so that if a new higher priority request is received, such as a level 1 priority request, then the new higher priority request can be processed prior to an existing lower priority request. It is contemplated that variations of the scheme can be implemented, for example more tiers can be employed and various methods used for determining a priority scheme. The priority level of an update request can also be dynamic. For example, an update request can increase in priority as it ages.

In an exemplary embodiment of the invention, a method of prioritizing update requests, comprises: receiving an update request at a Replication Priority Queue Manager; determining a priority for the request based upon a predetermined prioritization scheme; and storing the update request in a priority queue for retrieval by a Replication Decision Engine. In an exemplary embodiment of a method of the invention, a method of replicating an update or modification is provided which comprises: receiving an update request; determining a priority of the request in accordance with a predetermined scheme; storing the request in a priority queue in accordance with its assigned priority; and retrieving the update request in accordance with its assigned queue. The step of executing the update request in accordance with its assigned queue can comprise determining a destination for the request and sending the request to that destination.

An exemplary method of executing the replication requests comprises: retrieving a request from a queue, comparing the request with predetermined replication rules to determine a destination for the request; and sending the update request to the destination.

DETAILED DESCRIPTION

The embodiments of the present invention disclosed herein are merely examples of the present invention which may be embodied in various and alternative forms. The figures are not to scale and some features may be exaggerated or minimized to show details of particular elements, while related elements may have been eliminated to prevent obscuring novel aspects. Therefore, the structural and functional details disclosed herein are not to be interpreted as limiting, but merely as a basis for the claims and as a representative basis for teaching one skilled in the art to variously employ the present invention.

Embodiments of the invention provide methods and systems for efficiently processing update requests to a listing directory. The system provides for the processing of update requests in accordance with a predetermined scheme so as to provide for the efficient updating of a directory. Furthermore, the present invention provides systems and methods for replicating updates throughout a server system.

In one exemplary embodiment a Replication Management System (RMS) is provided that receives an update request and assigns a queue value to the update request depending upon the predetermined scheme. The update request is then stored in a corresponding queue associated with its assigned priority. Updates are then executed in accordance with the assigned priority. In an exemplary embodiment, a Replication Management System comprises a Replication Priority Queue Manager (RPQM) and a Replication Decision Engine (RDE).

Figure 1:
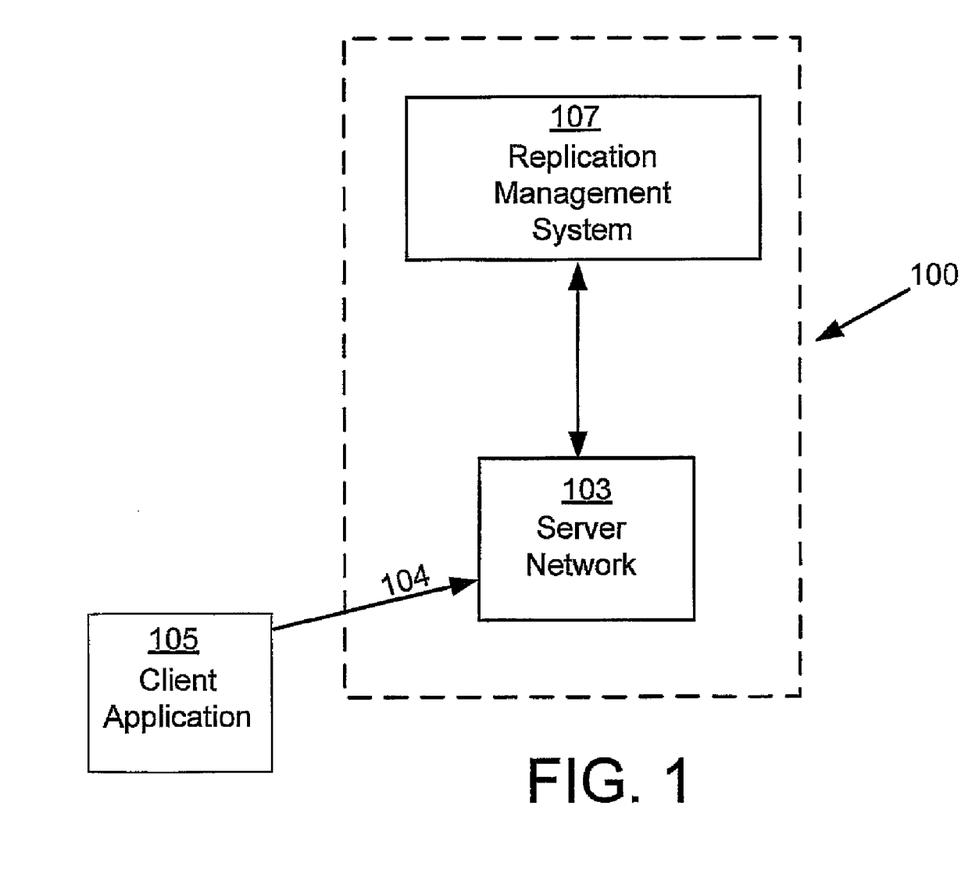
FIG. 1 shows a communications system in accordance with an exemplary embodiment of the invention.

Turning to the figures where like reference numerals represent like features throughout, FIG. 1 shows a communications system 100 in accordance with an exemplary embodiment of the invention. The communications system 100 includes a server network 103 adapted to receive update requests 104 from a client application 105. By update request it is meant a request sent to the server network requesting an update to the server network 103 that is typically triggered by a modification made by a client application. The update request can include a request to replicate the modification to servers in addition to a master server and/or all LDAP servers in a server network, and may be referred to herein as a replication request. In the exemplary embodiments shown, the client application 105 can be an email application residing on a cellular telephone, but it should be understood that the client application could be one of a variety of applications.

The server network 103 is adapted to receive the update request and communicate with a Replication Management System 107 as will be described in more detail below. The Replication Management System (RMS) 107 receives the update requests 104 from the server network 103 and assigns each update request a priority level based upon a predetermined scheme. Each update request is then assigned to a queue based upon it assigned priority. The update requests are then processed in accordance with the particular queue in which they are located.

Figure 2:
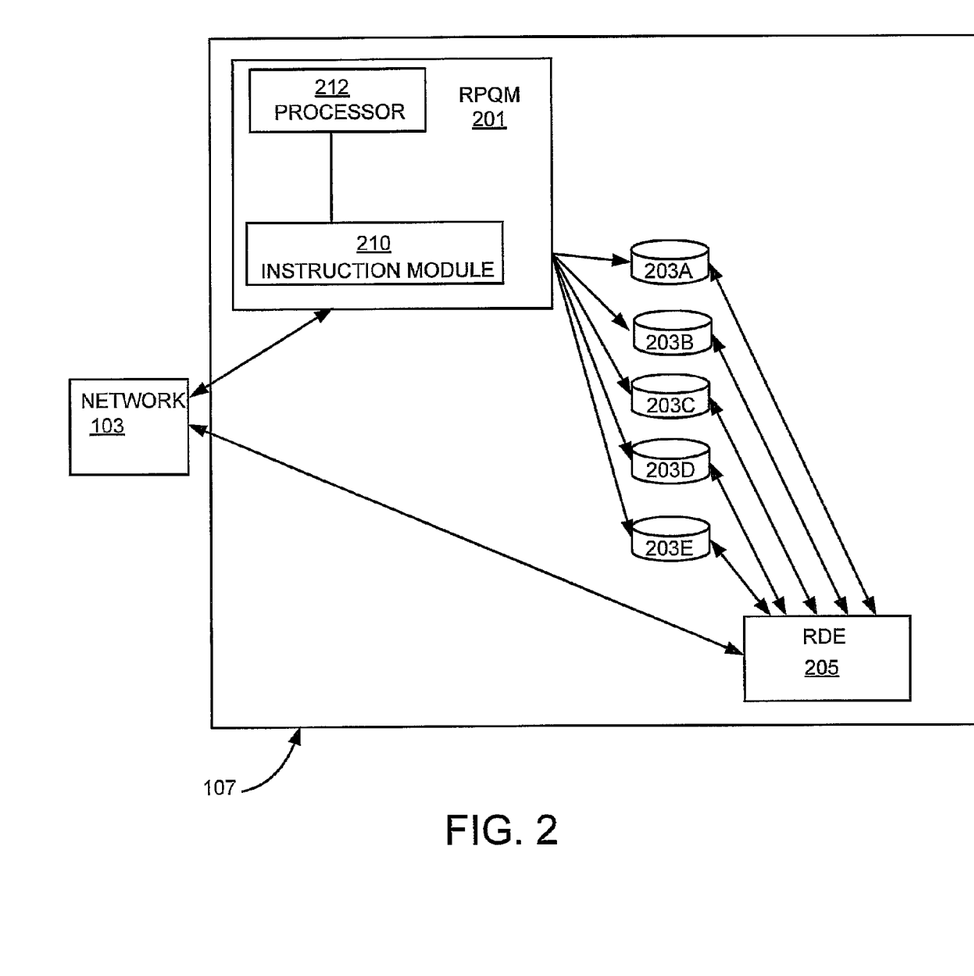
FIG. 2 shows a Replication Management System in accordance with an exemplary embodiment of the invention.

FIG. 2 shows a Replication Management System (RMS) 107 in accordance with an exemplary embodiment of the invention. In this example, the RMS 107 comprises a Replication Priority Queue Manager (RPQM) 201, a plurality of storage means 203A-203E, and a Replication Decision Engine (RDE) 205. Although shown as outside the sever network 103, it is contemplated that the RMS 107 could be part of the server network 103 such as residing on a master server as discussed in more detail below.

The RPQM 201 can include an instruction module 210 including instructions for determining a priority of a request in accordance with a predetermined scheme, a processor 212 communicatively coupled to the instruction module 210 and adapted for executing the instructions. The instruction can include memory for storing the instructions of the instruction module. Though shown as a processor 212 and an instruction module 210 in FIG. 2, the RPQM 201 can be in the form of hardware, software, or firmware.

The RPQM 201 is communicatively coupled to the server network 103 so that when the server network 103 receives an update request, the request can be sent from the server network 103 to the RPQM 201. When the RPQM 201 receives the update request from the server network 103, it determines a priority for the update request in accordance with a predetermined scheme. For example, if the update is of high priority it can be assigned a priority level 1 whereas if the update is of low priority it can be assigned a priority level of 5. The update request is then stored in one of the storage means 203A-E in accordance with its assigned priority level.

Figure 3:
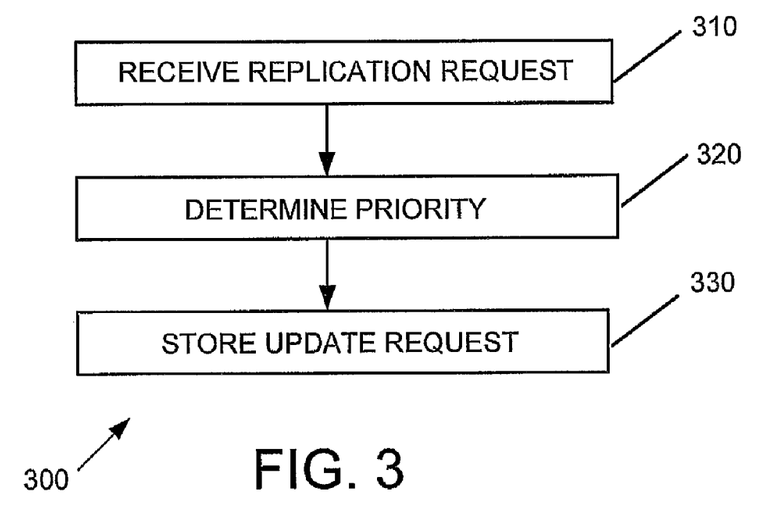
FIG. 3 shows a communications system in accordance with an exemplary embodiment of the invention.

FIG. 3 shows an exemplary method 300 of operation that can be practiced by the RPQM 201. At step 310 an update request is received by the RPQM 201. At step 320 the RPQM 201 assigns a priority level to the update request in accordance with a predetermined scheme. The particular scheme employed by the RPQM 201 can vary and can be periodically modified. The scheme can be based upon a variety of factors such as, by way of example and not limitation, the field or record which will be updated, the identity of the requester of the update, the time the update is requested, the age of the update request, and the identity of the application being modified. For example, an update request to change a password field can be given a higher priority than an update request to modify to a billing address field; an update request from a third party content provider can be given a higher priority than an update request from a party that does not provide content; an update request associated with a premium application can be assigned a higher priority than an update request associated with a non-premium application; and an update request submitted during day time hours can be assigned a higher priority than a request submitted during night time hours. In addition, update requests can be assigned a higher priority when it ages beyond a predetermined time threshold. At step 330 the RPQM 201 stores the update request in the storage means 203A-E in accordance with its assigned priority. This process is repeated for each request received. The RPQM 201 can continue to monitor the status of the requests and can change a request's priority level over time. For example, if the selected scheme includes a rule which increases a request's priority as it ages, the RPQM 201 can monitor the age of the requests and reassign an update request priority accordingly. For example, an update request that was assigned a priority level 2 and stored in storage means 203B can be moved up to a priority level 1 and moved to storage means 203A if the update request ages beyond a predetermined time threshold. This helps prevent the situation in which a low priority request that has already been received is never processed due to continuously incoming higher priority requests.

The Replication Decision Engine (RDE) 205 processes the update requests stored by the RPQM 201. In one exemplary embodiment, the RDE 205 simply executes the update requests in accordance with their storage location. Because the RPQM 201 has stored the update requests in locations (storage means 203A-E) according to their priority, the RDE 205 can simply progress through the different storage means in order of each storage means priority. For example, storage means 203A can be used to store update requests having a priority 1, storage means 203B can be used to store update requests having priority level 2, and so on. The RDE 205 can then process the requests stored in storage means 203A, then 203B, and so on, effectively processing the update requests in order of priority. It is contemplated that the RDE 205 can also be provided with a scheme for processing the update requests within each storage means 203A-E. For example, the RDE 205 can be assigned a scheme for processing the update requests within each storage means, such as on a first-in-first-out basis. The RDE 205 can also continually check as to whether a higher priority update request has been received while the RDE 205 is processing lower level requests. If that is the case, then the RDE 205 can stop executing a lower level requests to execute the newly received higher level update request. Of course the scheme of the RDE 205 should be compatible with the scheme used by the RPQM 201 in assigning the priority levels to ensure that higher priority requests are processed prior to lower priority requests.

Figure 4:
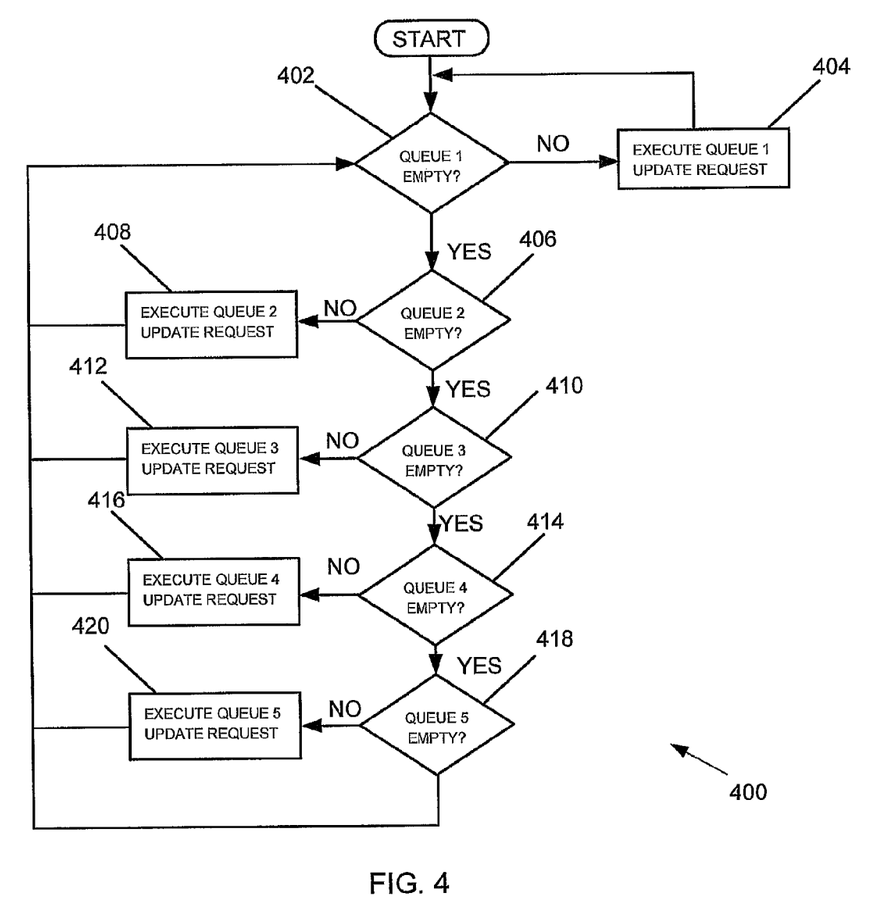
FIG. 4 shows a method of processing update requests in accordance with an exemplary embodiment of the invention.

FIG. 4 shows an exemplary method of processing the update requests. At step 402 the RDE 205 determines whether the queue for the highest priority update requests, queue 1, is empty. This can be done by determining whether the storage means 203A associated with the priority 1 update requests is empty. If the priority 1 queue is not empty, i.e., there are priority 1 update requests to be processed, the RDE 205 processes those update requests at step 404. If at step 402 it is determined that the priority 1 queue is empty then at step 406 the RDE 205 determines whether the priority 2 queue is empty. If the priority 2 queue is not empty, then the RDE 205 processes update requests in the priority 2 queue at step 408. After the priority 2 queue updates are processed the RDE 205 again goes to step 402 to determine whether the priority 1 queue is empty. In this example, the RDE 205 processes all of the priority 2 queue updates before again determining whether the priority 1 queue is empty. It is contemplated however that the RDE 205 can be provided with various rules for monitoring whether there are update requests in the priority 1 queue. For example, the RDE 205 can continuously monitor the priority 1 queue and if an update request is found immediately execute that update.

If there were no update requests found in step 406 then at step 410 the RDE 205 determines whether there are any priority 3 updates to process. If so, then at step 412 the priority 3 requests are processed. If not then at step 414 the RDE 205 determines whether there are priority 4 update requests to process and either processes the priority 4 update requests 416 or looks for priority 5 requests 418. If priority 5 requests are found they are processed at step 420. As shown in FIG. 4, the RDE 205 continues to determine whether a higher priority update request is found and if so, processes that request.

Figure 5:
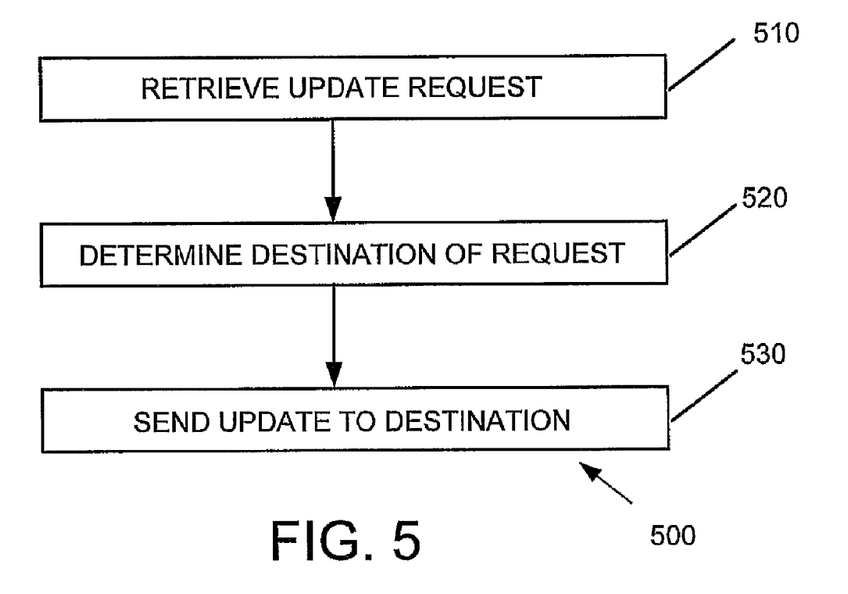
FIG. 5 shows a method of executing an update request in accordance with an exemplary embodiment of the invention.

While FIG. 4 shows an exemplary method 400 of how the RDE 205 determines which update request to process, FIG. 5 500 shows an exemplary method of executing a particular update request. To execute a particular update request the RDE 205 retrieves the request from the storage means 203A-E. The RDE 205 then reads the request and matches the request against predetermined replication rules to determine a final destination for the update request. Depending upon the particular request, the destination can be another server, by way of example and not limitation, another LDAP master server, a LDAP hub server, or a LDAP proxy server.

Thus, as shown in an exemplary method of processing an update request in FIG. 5, at step 510 the RDE 205 retrieves an update request. At step 520 the RDE 205 determines the desired destination of the update. This can be done by comparing the request with predetermined replication rules. Once the appropriate destination is determined, at step 530 the RDE 205 sends the update to the appropriate destination thereby replicating the update throughout the server network. The present invention thus provides methods and systems for processing update requests and replicating data in accordance with predetermined business rules.

Figure 6:
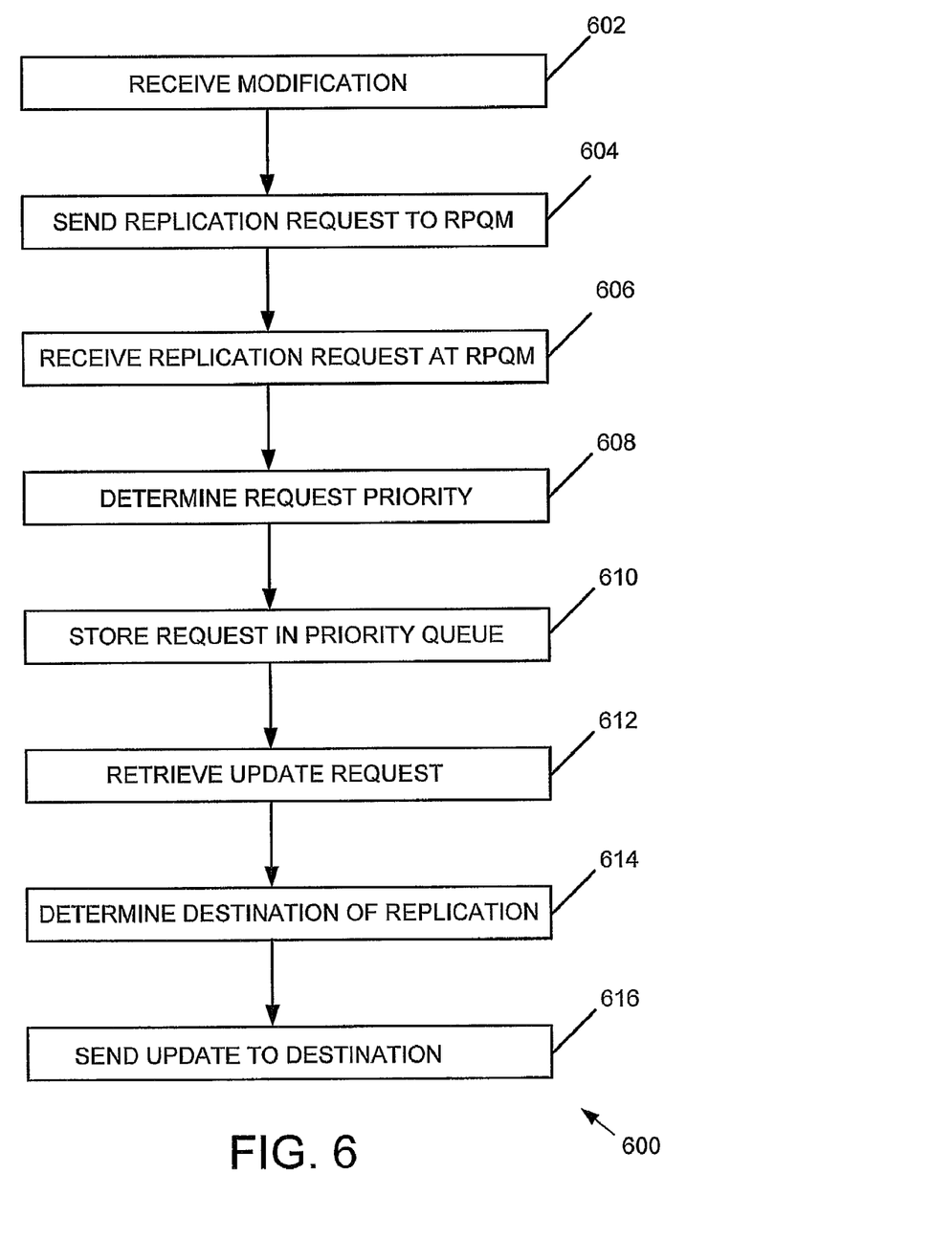
FIG. 6 shows a method of replicating in accordance with an exemplary embodiment of the invention.
Figure 7:
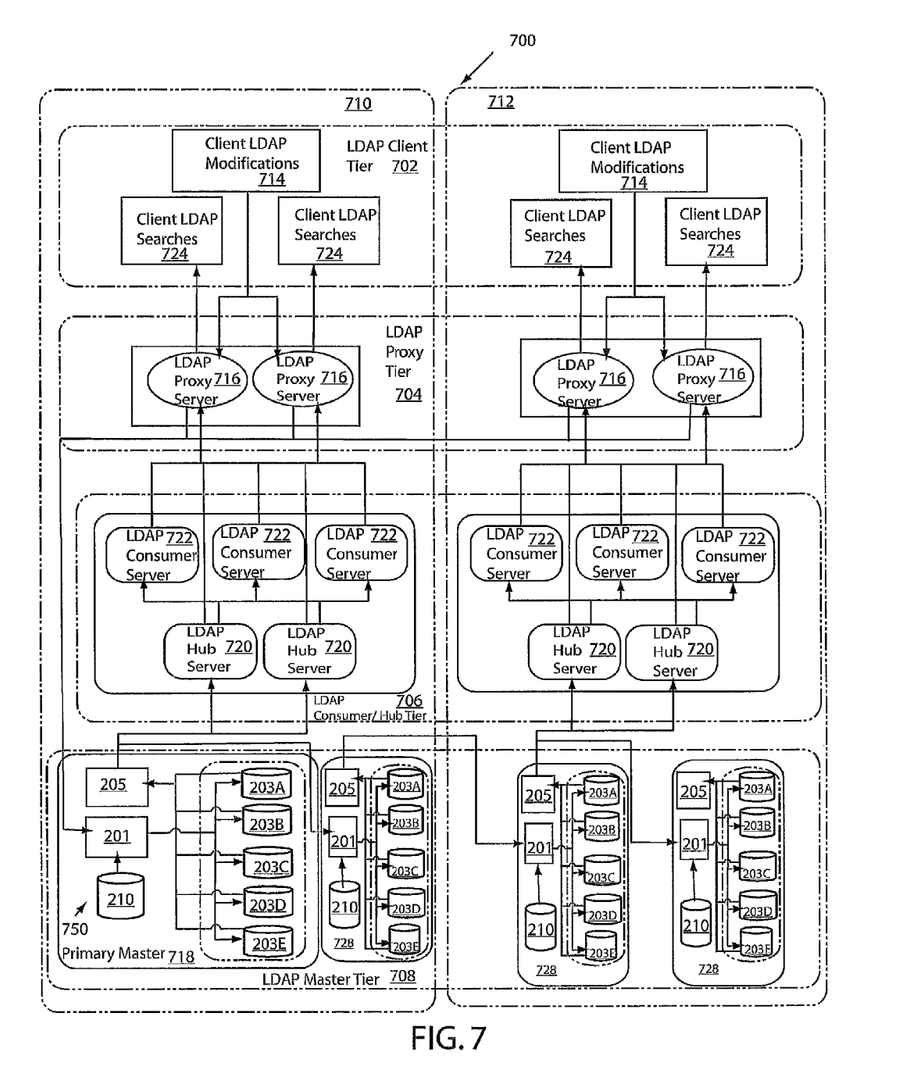
FIG. 7 shows a system flow diagram of a method or processing replication requests in accordance with an exemplary embodiment of the invention.

FIG. 6 shows an exemplary flow diagram of processing a request by a server network. As seen in FIG. 7, a server network 700 can include two branches 710; 712 that serve different locations of the server network 700. Each server branch 710; 712 includes servers that form a part of different server tiers, including a LDAP client server tier 702, an LDAP proxy server tier 704, a LDAP consumer/hub server tier 706, and a LDAP master server tier 708.

At step 602 a real time LDAP modification is made at the LDAP client server tier 702 and received by a LDAP proxy server 716 at an LDAP proxy tier 704. This modification includes a replication request. For example, a request is made to send updated data to a LDAP consumer server 720 at the LDAP consumer/hub server tier 706.

At step 604 the replication request is sent to the Replication Priority Queue Manager (RPQM) 201 that resides at a primary master server 718. As discussed above, the RPQM 201 receives the replication request at step 606 and at step 608 determines a priority for the replication request using a predetermined scheme of business rules stored in the instruction module 210. At step 610 the update is stored in a storage means 203A-E. In this example it will be assumed that the replication request is assigned a priority level of 2 and stored in storage means 203B.

As discussed above the Replication Decision Engine (RDE) 205 retrieves the request from the storage means 203B in step 612 after processing the updates from the higher priority queue of storage means 203A. At step 614 the RDE 205 matches the replication rules with the replication request to determine the destination associated with the replication request. In this case, because the destination is a LDAP consumer server 722 on the LDAP proxy tier 704 the update is replicated to the LDAP consumer server 722 at step 616. With the update now replicated to LDAP consumer server 722, client LDAP searches 724 can be satisfied as the LDAP proxy server 716 of the LDAP proxy tier 704 performs a search on the updated LDAP consumer server 722 of the LDAP consumer/hub tier 706. In this exemplary embodiment the update was sent to a LDAP consumer server 722 on the server branch 710 at which the request is received it is contemplated that the update can be replicated to other servers on the server network 700 such as LDAP hub servers 718, LDAP consumer servers 720, and LDAP proxy servers 716. Furthermore, whereas the Replication Management System 750 is shown associated with a primary master tier server 718 it is contemplated that an RMS 750 could be used on other servers.

Again, the illustrated and described embodiments of the present invention contained herein are exemplary examples set forth for a clear understanding of the invention and are not intended to be interpreted as limitations. Variations and modifications may be made to the above-described embodiments, and the embodiments may be combined, without departing from the scope of the claims.

What is claimed is:

1. A method, for updating a lightweight directory access protocol server network, comprising:
   receiving, at a replication priority queue manager of a replication management system, a plurality of update requests, each of which comprises instructions to replicate certain data from a master lightweight directory access protocol server of the server network to a plurality of slave lightweight directory access protocol servers of the server network;
   assigning, at the replication priority queue manager, for each of the plurality of update requests, a priority level wherein assigning the priority level for each of the plurality of update requests includes:
      (i) assigning, at the replication priority queue manager, the priority level for each of the plurality of update requests based upon an age of the update request;
      (ii) monitoring, following assigning the priority for each of the plurality of update requests, a status of the update request in order to determine whether the age of the update request has gone beyond a predetermined time threshold; and
      (iii) reassigning, to each of the plurality of update requests for which it is determined, in the monitoring, that the age of the update request goes beyond the predetermined time threshold, a higher priority;
   storing, at the replication priority queue manager, each update request in one of a plurality of ordered storage locations in accordance with a priority last assigned to the update request, wherein:
      the storing includes moving the update request, from a first storage location of the plurality of ordered storage locations to a second storage location, if the update request is reassigned from a first priority to a second, higher, priority;
      the first storage location corresponds to the first priority; and
      the second storage location corresponds to the second priority;
   processing, at the replication decision engine, each of the plurality of update requests in order based upon the assigned storage locations; and
   replicating data identified in each of the plurality of update requests from the master lightweight directory access protocol server to the plurality of slave lightweight directory access protocol servers in order based upon the assigned storage locations.

2. The method of claim 1, wherein processing, at the replication decision engine, each of the plurality of update requests based upon the assigned priority level for each update request further comprises determining a corresponding destination server of the plurality of slave lightweight directory access protocol servers for an update associated with each update request.

3. The method of claim 2, wherein processing, at the replication decision engine, each of the plurality of update requests based upon the assigned priority level for each update request further comprises sending each update to the corresponding destination server.

4. The method of claim 1, wherein processing the plurality of update requests in order based upon the assigned storage locations includes processing the update requests according to a scheme for processing the updates within each of the plurality of storage locations.

5. The method of claim 4, wherein processing the plurality of update requests according to the scheme for processing the updates within each of the plurality of storage locations includes:
  checking, while processing a first update request of the plurality of update requests stored in a particular storage location of the plurality of storage locations, as to whether a higher priority update request has been received at the particular storage location in which the first update request was stored and, if a higher priority update request is received at the particular storage location; and
  stopping execution of the first update request, and commencing execution of the higher priority update request received at the particular storage location, if it is determined in the checking that the higher priority update request was received at the particular storage location.

6. The method of claim 4, wherein processing the plurality of update requests according to the scheme for processing the updates within each of the plurality of storage locations includes processing the updates within each of the plurality of storage locations according to a first-in-first-out basis.

7. A replication management system comprising:
  a replication priority queue manager comprising:
    an instruction module having instructions for determining a priority of incoming update requests; and
    a processor in communication with the instruction module, wherein the instructions, when executed by the processor, cause the processor to at least:
      receive a plurality of update requests, each of which comprises instructions to replicate certain data from a master lightweight directory access protocol server of the server network to a plurality of slave lightweight directory access protocol servers of the server network;
      assign, for each of the plurality of update requests, a priority level, wherein assigning the priority level for each of the plurality of update requests includes:
        (i) assigning, at the replication priority queue manager, the priority level for each of the plurality of update requests based upon an age of the update request;
        (ii) monitoring, following assigning the priority for each of the plurality of update requests, a status of the update request in order to determine whether the age of the update request has gone beyond a predetermined time threshold; and
        (iii) reassigning, to each of the plurality of update requests for which it is determined, in the monitoring, that the age of the update request goes beyond the predetermined time threshold, a higher priority; and
      store each update request in one of a plurality of ordered storage locations in accordance with a priority last assigned to the update request, wherein;
        storing includes moving the update request, from a first storage location of the plurality of ordered storage locations to a second storage location, if the update request is reassigned from a first priority to a second, higher, priority;
        the first storage location corresponds to the first priority; and
        the second storage location corresponds to the second priority; and
  the replication decision engine being configured to:
    process each of the plurality of update requests in order based upon the assigned storage locations; and
    replicate data identified in each of the plurality of update requests from the master lightweight directory access protocol server to the plurality of slave lightweight directory access protocol servers in order based upon the assigned storage locations.

8. The replication management system of claim 7, wherein the instructions further cause the processor is further configured to determine a corresponding destination server of the plurality of slave lightweight directory access protocol servers for an update associated with each update request.

9. The replication management system of claim 8, wherein the instructions further cause the processor replication decision engine is further configured to send each update to the corresponding destination server.

10. The replication management system of claim 7 wherein processing the plurality of update requests in order based upon the assigned storage locations includes processing the update requests according to a scheme for processing the updates within each of the plurality of storage locations.

11. The replication management system of claim 10 wherein processing the plurality of update requests according to the scheme for processing the updates within each of the plurality of storage locations, includes at least the following:
  checking, while processing a first update request of the plurality of update requests stored in a particular storage location of the plurality of storage locations, as to whether a higher priority update request has been received at the particular storage location in which the first update request was stored and, if a higher priority update request is received at the particular storage location; and
  stopping execution of the first update request, and commencing execution of the higher priority update request received at the particular storage location, if it is determined in the checking that the higher priority update request was received at the particular storage location.

12. The replication management system of claim 10 wherein processing the plurality of update requests according to the scheme for processing the updates within each of the plurality of storage locations, includes processing the updates within each of the plurality of storage locations according to a first-in-first-out basis.

13. A server network system comprising:
  a server network comprising a lightweight directory access protocol lightweight directory access protocol client tier that includes at least one lightweight directory access protocol client server, and lightweight directory access protocol master tier that includes at least one lightweight directory access protocol master server, wherein the lightweight directory access protocol master tier is configured to receive update requests from the lightweight directory access protocol client tier and process the update requests via a replication management system; and the replication management system, being communicatively coupled to the server network and having a processor and instructions that, when executed by the processor, cause the processor to:

receive a plurality of update requests, each of which comprises instructions to replicate certain data from a master lightweight directory access protocol server of the server network to a plurality of slave lightweight directory access protocol servers of the server network;

assign, for each of the plurality of update requests, a priority level, wherein assigning the priority level for each of the plurality of update requests includes:
(i) assigning, at the replication priority queue manager, the priority level for each of the plurality of update requests based upon an age of the update request
(ii) monitoring, following assigning the priority for each of the plurality of update requests, a status of the update request in order to determine whether the age of the update request has gone beyond a predetermined time threshold; and
(iii) reassigning, to each of the plurality of update requests for which it is determined, in the monitoring, that the age of the update request goes beyond the predetermined time threshold, a higher priority;

store each update request in one of a plurality of ordered storage locations in accordance with a priority last assigned to the update request, wherein:
storing includes moving the update request, from a first storage location of the plurality of ordered storage locations to a second storage location, if the update request is reassigned from a first priority to a second, higher, priority;
the first storage location corresponds to the first priority; and
the second storage location corresponds to the second priority;

process each of the plurality of update requests in order based upon the assigned storage locations; and replicate data identified in each of the plurality of update requests from the master lightweight directory access protocol server to the plurality of slave lightweight directory access protocol servers in order based upon the assigned storage locations.

14. The server network system of claim 13, wherein the instructions, when executed by the processor, further cause the processor to determine a corresponding destination server of the plurality of slave lightweight directory access protocol servers for an update associated with each update request.

15. The server network system of claim 14, wherein the instructions, when executed by the processor, further cause the processor to send each update to the corresponding destination server.

16. The server network system of claim 13, wherein the instructions, when executed by the processor, further cause the processor to, in processing the plurality of update requests in order based upon the assigned storage locations, process the update requests according to a scheme for processing the updates within each of the plurality of storage locations.

17. The server network system of claim 16, wherein the instructions, when executed by the processor, further cause the processor to, in processing the plurality of update requests according to the scheme for processing the updates within each of the plurality of storage locations, perform at least the following:
checking, while processing a first update request of the plurality of update requests stored in a particular storage location of the plurality of storage locations, as to whether a higher priority update request has been received at the particular storage location in which the first update request was stored and, if a higher priority update request is received at the particular storage location; and
stopping execution of the first update request, and commencing execution of the higher priority update request received at the particular storage location, if it is determined in the checking that the higher priority update request was received at the particular storage location.

18. The server network system of claim 16, wherein the instructions, when executed by the processor, further cause the processor to, in processing the plurality of update requests according to the scheme for processing the updates within each of the plurality of storage locations, process the updates within each of the plurality of storage locations according to a first-in-first-out basis.

* * * * *